No. 656,076. Patented Aug. 14, 1900.
G. L. ADDENBROOKE.
METHOD OF ELECTROSTATICALLY MEASURING CURRENTS IN WORKING CIRCUITS.
(Application filed May 7, 1900.)
(No Model.) 4 Sheets—Sheet 1.

Witnesses.
C. Britt.
R. Rogers.

Inventor.
George L. Addenbrooke,
by Fairfax & Wetter,
Attorneys.

No. 656,076. Patented Aug. 14, 1900.
G. L. ADDENBROOKE.
METHOD OF ELECTROSTATICALLY MEASURING CURRENTS IN WORKING CIRCUITS.
(Application filed May 7, 1900.)
(No Model.)
4 Sheets—Sheet 4.

Witnesses.
C. Brett.
R. Rogers.

Inventor.
George L. Addenbrooke,
by Fairfax & Netter,
Attorneys.

UNITED STATES PATENT OFFICE.

GEORGE LEONARD ADDENBROOKE, OF LONDON, ENGLAND.

METHOD OF ELECTROSTATICALLY MEASURING CURRENTS IN WORKING CIRCUITS.

SPECIFICATION forming part of Letters Patent No. 656,076, dated August 14, 1900.

Application filed May 7, 1900. Serial No. 15,783. (No specimens.)

*To all whom it may concern:*

Be it known that I, GEORGE LEONARD ADDENBROOKE, a subject of the Queen of Great Britain and Ireland, residing and having my post-office address at 53 Victoria street, Westminster, London, England, have invented certain new and useful Improvements in Methods of Electrostatically Measuring Electric Currents in Working Circuits, (for which I have obtained British Letters Patent, dated October 18, 1899, and numbered 20,862,) of which the following is a specification.

My invention relates to the method used in electrostatically measuring electric currents in a working circuit, the object being to avoid certain difficulties or drawbacks met with in general practice when measuring the said currents and to insure greater exactness in the results obtained.

Owing to the delicacy of construction and adjustment of the electrostatic instruments used for making fine measurements of electricity it often happens that when the measurements are taken outside of the laboratory in which the instruments were standardized or calibrated the shocks sustained on the journey to the place of use render them inaccurate. To ascertain if any change of adjustment has taken place, the instruments are sometimes returned to where they were originally calibrated, and thus a double error may be introduced, so that any readings obtained are of doubtful accuracy. By my invention I am enabled to test all the instruments employed at the place of use under similar and working conditions and to immediately proceed to take the measurements required without any danger of disturbing the standard adjustments arrived at. This I am enabled to do with great facility by the aid of apparatus, and, further, to repeat the tests immediately after the measurements are taken. Consequently the results arrived at are not only accurate in themselves, but all doubt as to their accuracy is eliminated.

The invention is applicable for use in measuring alternating or continuous currents.

The apparatus referred to and the connections used are indicated by the diagrams shown in the accompanying drawings, to which reference is made.

Figure 1:
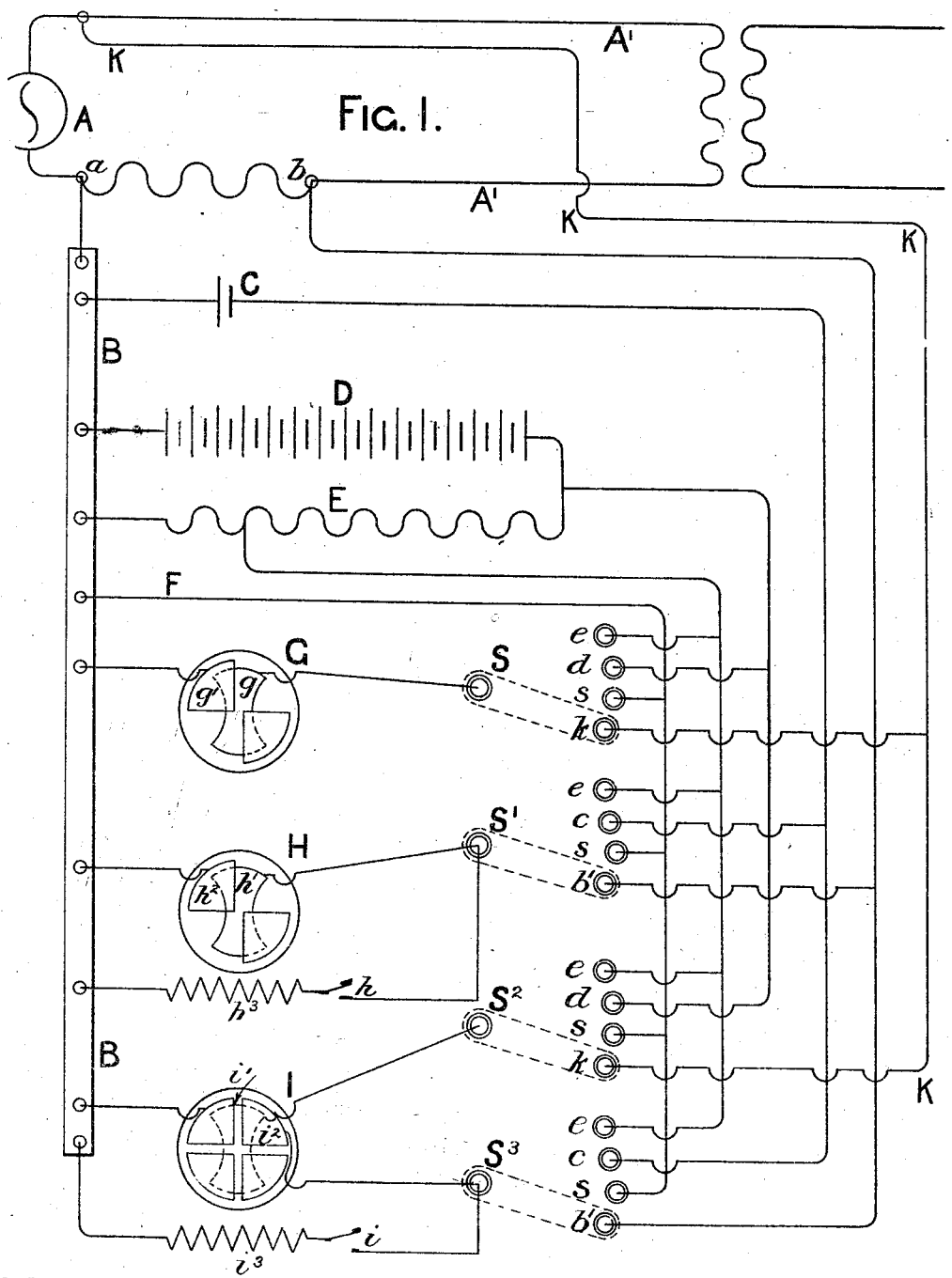
Figure 2:
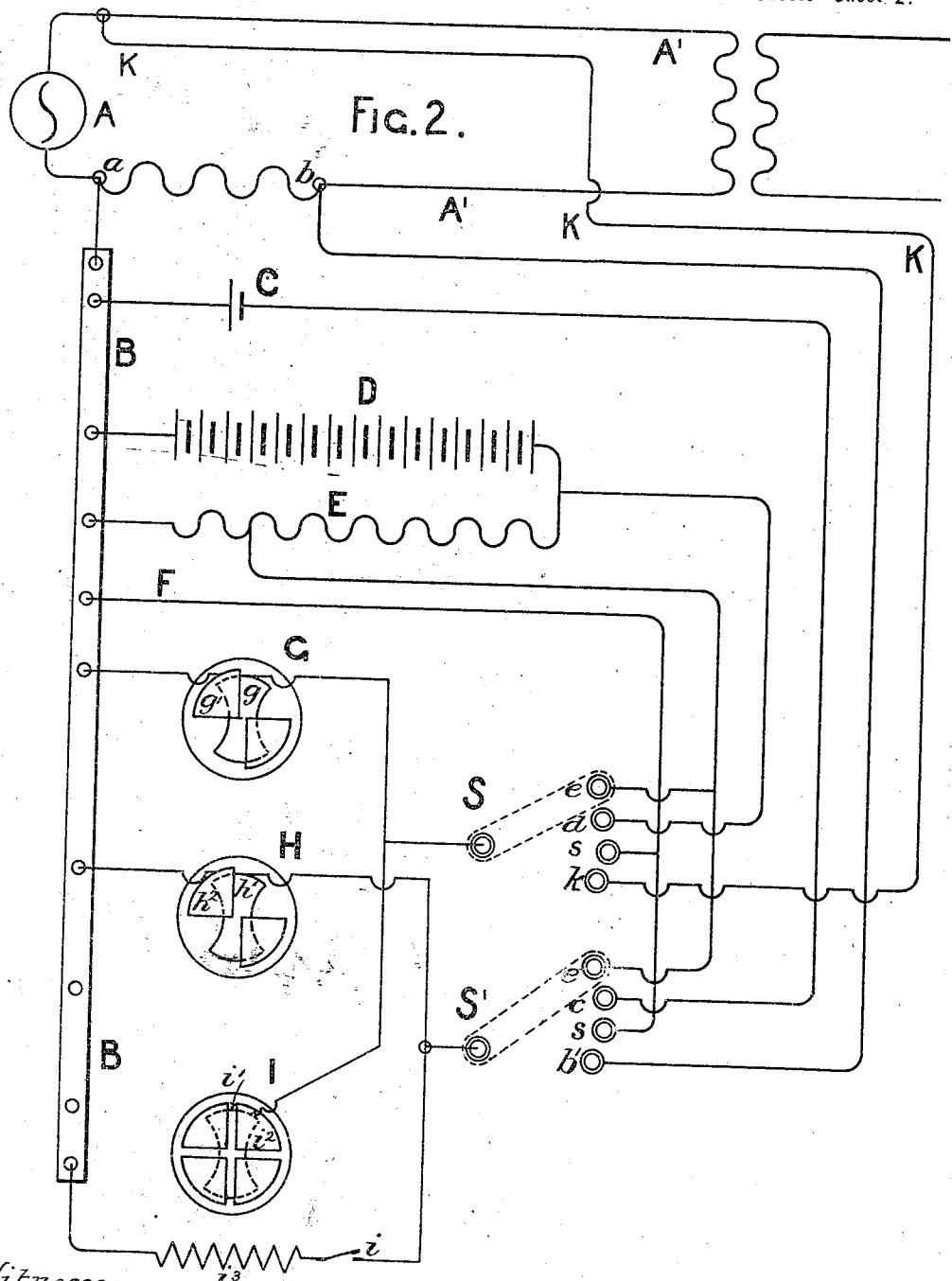
Figure 3:
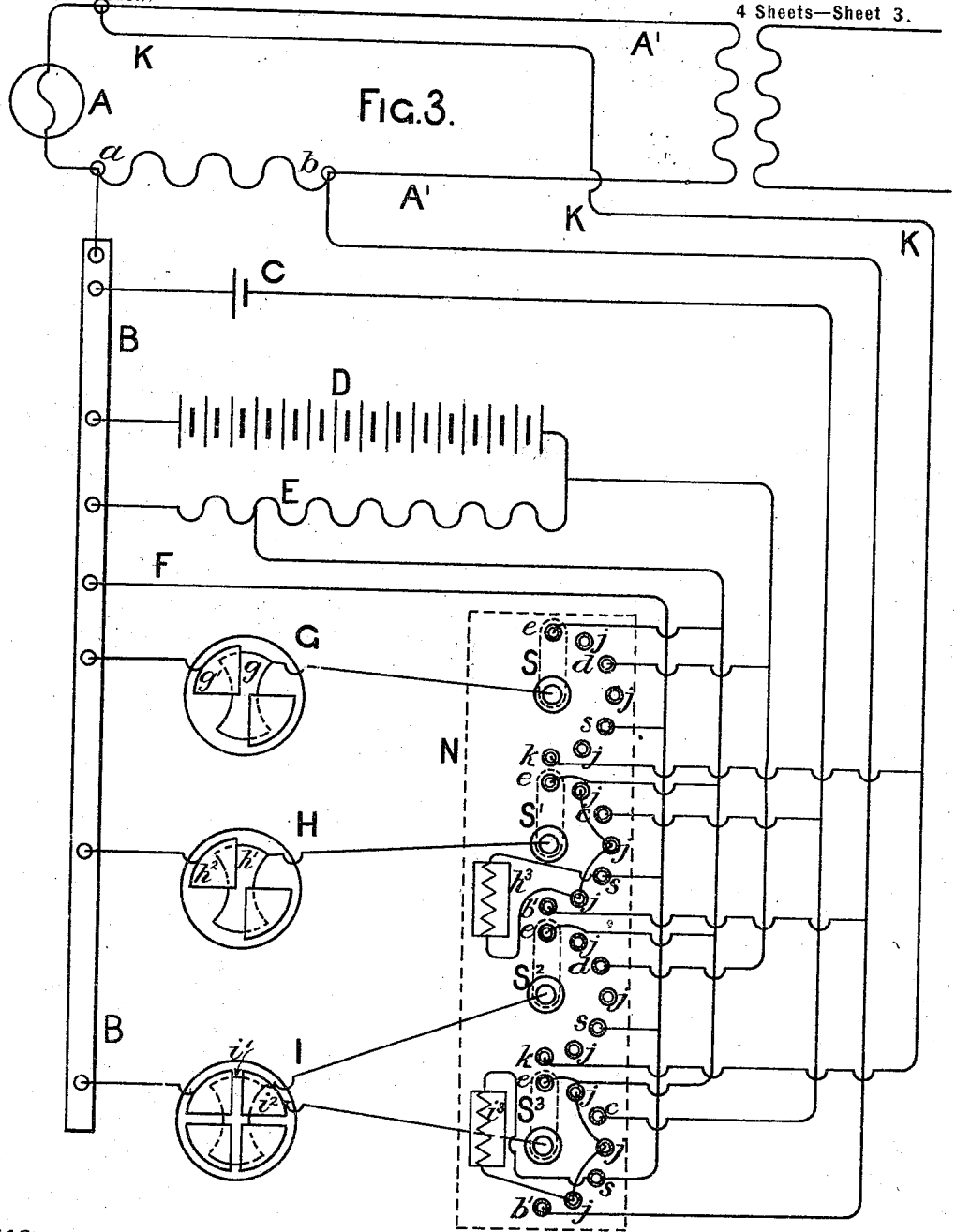
Figure 4:
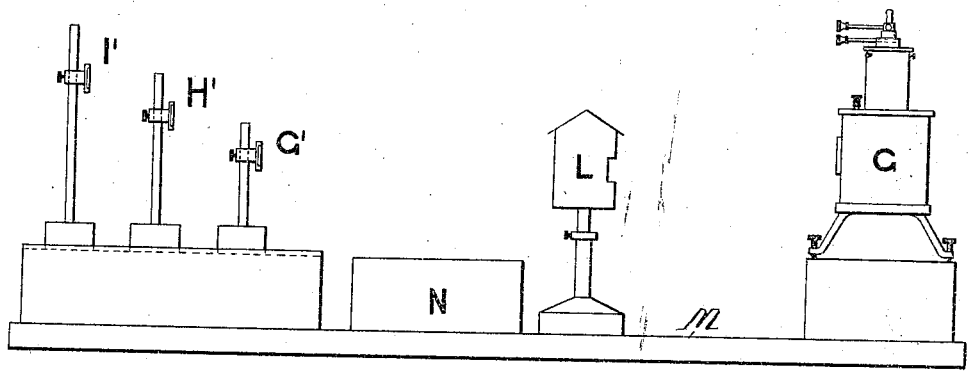
Figure 5:
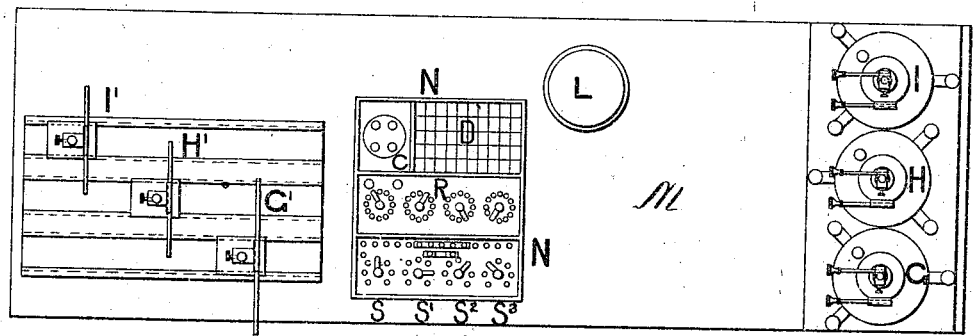

Figure 1 is a diagram of a switchboard apparatus and connections used in calibrating the instruments employed and in measuring the factors or elements of an alternating or continuous current. Fig. 2 is a diagrammatic arrangement of similar apparatus and connections for measuring the elements of an alternating or continuous current, but having the four switches shown in Fig. 1 combined to form two switches only. Fig. 3 is a similar diagram to Fig. 1, on an enlarged scale, but showing certain modifications in the switches and their connections. Fig. 4 is a general elevation of the apparatus employed, showing the instruments, lamp, switchboard apparatus, and adjustable scales on which the readings from the reflecting-mirrors of the instruments are taken; and Fig. 5 is a plan of Fig. 4.

In measuring alternating currents, if there is inductance of capacity in the circuit, it is found that the current which flows is influenced by three factors—first, the resistance of the circuit and the work done within it; second, the current taken to produce the magnetic field created by the flow of current itself, and, third, the current required to charge the electrostatic capacity in connection with the circuit. The magnetic and electrostatic effects, being exactly opposite in phase, counterbalance each other as far as may be, the larger factor, however, predominating and producing a resultant effect either ninety degrees behind or in advance of the phase of the energy-current, according as the self-induction or capacity predominates. This resultant current when further combined with the energy-current produces the compound current actually flowing through the circuit, which evidently will not be in phase with any of its components. Therefore to measure the components of such currents it is necessary to adopt some principle which will separate either the self-induction or the capacity current (whichever predominates) from the energy-current either by direct measurement or by inference. In considering this three leading principles are found on which methods for measuring alternating currents may be based, and these are termed, first, the "three-voltmeter" principle; second, the "three-ammeter" principle, and, third, the "wattmeter" principle. The theory of these principles being explained in leading text-books, they need not be described in detail here. In practice there are certain disadvantages connected with the first and second principles named, so that while they may sometimes be used the third, or wattmeter, principle is the most convenient to employ in taking in measurements. Consequently, and while by slight and obvious modification my method and apparatus may be used under all three of the principles named, the following description especially refers to the method I have founded on the aforesaid third, or wattmeter, principle. In employing this method three measurements must be made, being, first, the impressed volts; second, the apparent amperes, and, third, the effective amperes, or the effective watts; but if the effective watts are measured, and knowing the effective volts, the effective amperes can be deduced. Knowing these qualities we can, in addition, deduce the power factor, the angle of lag, and the magnetizing or capacity current or their resultant, if both are present. Also, if we know the periodicity of the alterations, other characteristics are also obtainable. Finally, if inductance and capacity are present by measuring one of them we can with the above data find the other. To carry out this method in an accurate and expeditious manner, I have devised the apparatus already referred to, by which the measuring instruments employed may be readily compared with a standard and calibrated in a few moments at any time without altering or disturbing the apparatus and its connections otherwise than by moving plugs or switches on a switchboard. In connection with this apparatus I employ three instruments of the electrostatic type—a wattmeter, a voltmeter, and an ammeter—and when a high degree of accuracy is required the instruments are made reflecting to read off upon a suitable scale or scales.

The apparatus is provided with a suitable set of switches and terminals having indicating-marks thereon arranged, as described hereinafter, with the necessary connections from each of the instruments and means for separately standardizing each instrument, as well as for connecting it to a circuit on which measurements are to be made. In addition the apparatus comprises a standard cell, (preferably of the "Clarke" type,) a resistance for varying the ratio of resistance, such as a potentiometer or "Wheatstone" bridge, ranging, say, to ten thousand ohms, a secondary battery or other source of electromotive force of suitable voltage, and a set of adjustable non-inductive resistances made of short lengths of wire or strips of metal having a low temperature coefficient. The resistance of these lengths must be accurately measured and (when sensitive instruments are used) is conveniently such that one volt may be dissipated between the two ends without much heating when the normal current for which they are intended is passed through them. An omnibus or common-terminal bar, with suitable means for connecting thereto, is provided, and the apparatus is ready for use, as indicated by the diagram Fig. 1.

In the diagram Fig. 1, A indicates an alternating-current-generating machine having a main circuit A', wherein is placed a non-inductive measured resistance $a\, b$, proportioned to the sensitiveness of the instruments used. From the point $a$ a connection is shown to an omnibus or common-terminal bar B, to which most of the circuits hereinafter mentioned are joined. These are conveniently arranged and shown in the following order: a standard cell C, (such as a Clarke cell,) a battery (or other source or electromotive force) D of sufficient power to give the maximum degree of voltage required, a ratio resistance E, adapted to supply any required voltage to the instruments, a short-circuit connection F between the bar B and a terminal $s$ in each of the switches indicated below, whereby any of the instruments may be short-circuited, a voltmeter G, provided with a switch S, an ammeter H, provided with a switch S', and a wattmeter I, having two switches $S^2$ and $S^3$. The voltmeter-switch S has four terminals $e$, $d$, $s$, and $k$, the terminal $s$ short-circuiting the instrument, as above stated. With the switch in contact with the terminal $d$ the instrument is connected to the battery D, and, similarly, when in contact with the terminal $e$ the switch puts the instrument in connection with the ratio resistance E, so that a desired part or ratio of the whole resistance can be measured off and any required voltage within the limit of the battery put upon the needle $g$ of the voltmeter G, its quadrant-plates $g'$ being connected to the bar B. By this means the voltmeter can be calibrated throughout the whole range of its scale, as referred to hereinafter. The terminal $k$ serves to place the needle $g$ in connection with the circuit K, on which measurements are to be made. The ammeter-switch S' is similarly provided with four terminals, (indicated by the reference-letters $e$, $c$, $s$, and $b'$.) The terminal $e$ likewise connects the needle $h'$ of the instruments H with the ratio resistance E to put any required voltage on the needle, and thus enabling the ammeter also to be calibrated throughout its entire scale. The terminal $c$ is for connecting the needle $h'$ with the standard cell C, the quadrant-plates $h^2$ being connected to the bar B. the terminal $s$ is for short-circuiting the instrument, and the remaining terminal $b'$ connects the ammeter to the main circuit A' at the $b$ end of the measured non-inductive resistance $a\, b$. The ammeter H is also provided with a working key $h$, adapted to short-circuit the instrument through a high resistance $h^3$ of (for example) twenty thousand ohms.

The wattmeter I has a double set of switch-terminals, one set $e$, $d$, $s$, and $k$ for the switch $S^2$ being exactly the same and with the same circuit connections as above described for the voltmeter G. The other set for the switch $S^3$ consists of the terminal $e$, connected by the switch to one pair of quadrant-plates $i^2$ and used for putting them in connection with the ratio resistance E, as above stated, a terminal $c$ to connect them to standard cell C exactly the same as for the ammeter H, a terminal $s$ for short-circuiting the quadrants of the instrument, and a terminal $b'$, having the same connection to the $b$ end of the measured non-inductive resistance in the main circuit as described above for the ammeter H. The switch $S^2$ connects the needle $i'$ with the first set of terminals $e, d, s$, and $k$, as indicated in Fig. 1, and the additional switch $S^3$ connects the wattmeter quadrant-plates $i^2$ through the second set of terminals $e, c, s$, and $b'$. A key $i$, similar to the key $h$, used with the ammeter, is also employed in working to short-circuit the wattmeter quadrant-plates $i^2$ through a high resistance—for example, twenty thousand ohms.

The method of using the apparatus is as follows: The wattmeter I is first standardized by connecting the positive pole of the battery D through the terminal $d$ to the needle $i'$ of the instrument and the negative pole to one pair of quadrants and the case, the ratio resistance E being placed between the battery-terminals as a shunt, with, for example, ten thousand ohms out. The positive pole of the Clarke or other standard cell C is connected to the quadrants $i^2$, and the negative pole of the standard cell is connected to the other quadrants and the negative pole of the battery. This will produce a deflection of the needle $i'$, (with its reflecting-mirror,) and the amount of this deflection should be denoted upon an adjustable scale, such as is shown in Figs. 4 and 5, or by other suitable means convenient in working the instrument. I find in practice that if the electromotive force of the battery is one hundred volts and that of the standard cell is 1.44 volts a convenient deflection is about one hundred and forty-four millimeters on a scale at about two meters distance. My arrangements provide for putting the scales used on a support, as described hereinafter, with means for adjusting the same through a suitable range, and if the instrument is also adjustable for sensitiveness, so that its reflecting-mirror gives a desired range of deflection, by a few trials and the adjustment of the scale the instrument becomes direct reading. Having noted the first deflection upon the scale after making the adjustments, the connection from the quadrants of the wattmeter I to the positive pole of the standard cell C is removed and put across a portion of the ratio resistance E, by which the battery D is shunted. This resistance between the quadrant-leads, forming a portion of the whole resistance between the battery-terminals, is then increased or decreased by adjustment until the deflection reading on the scale produced by the wattmeter-mirror is exactly the same as that produced by the standard cell C. The total resistance across the battery D is then noted, as well as the resistance between the quadrant-leads, and the ratio of one to the other gives the electromotive force of the battery D in terms of the standard cell C, from which the number of volts is readily found. The electromotive force of the battery D having thus been ascertained and that of the standard cell C being known, the instrument I is calibrated as a wattmeter by calculation according to a recognized formula or practically as follows: Assuming the electromotive force of the battery D to be ninety volts and the standard cell C 1.44, then $90 \times 1.44 = 129.6$. The operator should then so adjust the scale that with the battery D connected to the needle of the instrument I the reading on the scale becomes 129.6 divisions. Then if the voltage on the needle is increased to one hundred volts while the quadrants remain at 1.44 the reading would become one hundred and forty-four degrees if the divisions were proportionate, and the instrument becomes direct reading. It is desirable to note, if great accuracy is required, that for very widely varying readings and when the voltage on the needle approaches more that between the quadrants there is a progressive alteration in the constant of electrostatic instruments when heterostatically connected, so that for low readings of this character it is desirable to calibrate the wattmeter somewhere in the neighborhood of the voltages to be used on it. Under these circumstances if the quadrants $i^2$ are connected to a resistance inserted in a circuit to be tested the reading must be divided by the value of the resistance in ohms, when the reading on the scale will directly indicate watts. Furthermore, having obtained the electromotive force of the battery D it is obvious that by reconnecting the wattmeter to the terminal $e$ of the ratio resistance E and the needle to the battery the operator can produce any deflection of the mirror through the whole scale as obtained when the instrument was connected to the circuit to be tested, and thus get its absolute value instead of reading by deflection. For instance, suppose the electrometer (or wattmeter I) when joined up to the circuit gives a deflection of one hundred and seventy-five degrees. The switches $S^2$ and $S^3$ are then put onto the terminals $d$ and $e$, respectively, which puts in the battery D and ratio resistance E. The ratio is adjusted until the deflection of one hundred and seventy-five degress is reproduced, when, knowing the value of the two ends or ranges of the ratio resistance and the electromotive force of the battery, we directly obtain the electromotive forces required to produce the said deflection. By shifting the scale back to a greater distance from the instrument, and thus making the deflection visible over a wider range upon the scale, or the insertion of a higher non-inductive resistance in the circuit an extreme degree of accuracy can be obtained. The wattmeter I being thus calibrated, the voltmeter G should next be put across the battery-terminals by the switch S through the terminal $d$ to obtain a deflection on the scale and the instrument and the scale adjusted to obtain a reading corresponding to the voltage of the battery, which has already been accurately ascertained. If, however, by trial the instrument employed does not give proportionate increments for increasing voltages, a curve of deflections should be made by aid of the ratio resistance E and used to correct the calculations when making the deflection-scale. In applying the apparatus to standardizing the ammeter H the standard cell C should be inserted between its terminals by the switch S' through the terminal $c$ and a reading taken from the scale. From this a scale reading by the square can also be constructed, as before. To ascertain if the ammeter deflections are proportionate throughout the scale, the switch should be turned to the terminal $e$ to put in the variable resistance E, which is then varied, as described above in reference to the wattmeter and voltmeter. Having thus calibrated the wattmeter I, the voltmeter G, and the ammeter H and arranged the scales for direct reading in the manner described, the connections of each instrument are now transferred to the circuit to be tested by means of the respective switch devices. It is to be understood that the ammeter H is directly connected across the terminals of the resistance $a$ $b$ and the quadrant-plates of the wattmeter I also, the needle of the latter being connected to the other side of the circuit. If, however, the instruments being arranged for direct reading, the resistance should not be one ohm, then the readings of the ammeter and the wattmeter must be divided by the actual resistance in ohms or part of an ohm to give the proper ratios in amperes and watts.

In testing a circuit where the lag of the current is very great and the watts are small, or vice versa, it is desirable in some cases for greater accuracy to have two separate resistances in the circuit, one for the ammeter and one for the wattmeter; but this is seldom necessary except for laboratory purposes.

In changing the instruments from one set of connections over to the other it is very desirable to have a means of separately short-circuiting the ammeter and the wattmeter quadrants through a high resistance of about twenty thousand ohms while the operation is performed; otherwise the quadrants must be left unconnected for a period of time which might lead to violent deflections of the needles from charges on the ebonite or other adjacent surfaces, otherwise difficult to avoid. This is provided for by the ammeter-key $h$ and resistance $h^3$ and by the wattmeter-key $i$ and resistance $i^3$, as shown in Fig. 1, or by the intermediate contacts, as in Fig. 3.

In testing circuits of high tension—say above two hundred and fifty volts—differing modes of procedure can be followed. In one a wattmeter and voltmeter arranged for high-pressure readings may be adopted, or a high non-inductive resistance may be inserted across the circuit and the two instruments, adapted for the usual range of, say, one hundred to two hundred volts, can then be connected across a portion of this resistance, or else a set of small condensers in "cascade" may be arranged across the circuit instead of the resistance and the instruments connected across one or more of them. Either of the plans is feasible with suitable instruments, and such are described in my British specification for "Improvements in electrometers and in keys for operating the same," dated December 6, 1898, No. 25,752; but on account of the difficulty of standardizing high-voltage instruments and the convenience of always keeping instruments at the same degree of sensitiveness I prefer for most purposes to use the resistance or condensers aforesaid.

It will be noticed that in Fig. 1 the connections to the wattmeter comprise a combination of the several connections of the voltmeter and ammeter. Consequently advantage is taken of this in some cases to reduce the number of connections and bring them to the terminals of two switches only, as is shown in Fig. 2. In this case it is better to attach a separate connection between the voltmeter G and the ratio resistance E, so that when the former is being calibrated at the higher potentials it requires the ammeter (being adapted for much lower potentials) may not be switched in accidentally or else the ammeter connections should be uncoupled while the voltmeter is being calibrated. It is further to be observed that the two switches shown in Fig. 2, having an equal number of terminals, may be so combined as to be operated by one handle in carrying out the necessary operations. Furthermore, by spacing the contacts already referred to and inserting between them other contacts $j$, Fig. 3, connected in multiple arc to the high resistances $h^3$ and $i^3$, described in relation to each of the keys $h$ and $i$, the function of the latter will be retained and performed automatically without the keys in preventing the quadrants from being entirely disconnected while the switch is passing from one contact-point to another. Although Fig. 2 is the simplest arrangement for general purposes, I prefer to employ four switches with their connections, as shown in Fig. 1, each switch adapted to make contact with either of four contact-terminals, in addition to the ammeter-key $h$ and the wattmeter-key $i$, or the alternative arrangement, Fig. 3. This enables each instrument to be operated independently and not only standardized but calibrated thoughout its whole scale by the contact-terminal $e$ and connection to the ratio resistance E.

If it is desired, the instruments may be connected to a circuit from which measurements are to be taken, and when the deflections are noted the switches are respectively moved to the contact e, while the ratio resistance E in shunt with the battery is adjusted until the exact deflection of each instrument is reproduced, from which the exact value of each deflection is easily found. By the insertion of the high-resistance contact j, Fig. 3, between the several terminals of the ammeter and wattmeter the keys h and i in Fig. 1 may in this case also be dispensed with, as aforesaid, and their function automatically performed in preventing the disconnection of the quadrants while the switch is passing from one contact-point to another.

In Figs. 4 and 5 a convenient arrangement of the general apparatus employed is shown, as I prefer it in making electrostatic measurements of electric currents, although it will be understood that modifications therein or omissions of or changes in the parts may be made without departing from the nature of my invention. In these figures a suitable lamp L is arranged to throw a beam of light upon the respective reflecting-mirrors suspended with the needles of the instruments G, H, and I, and those mirrors are so placed that their respective reflections of the beam of light are cast upon the corresponding scales G', H', and I'. For convenience the scales vary in height, and each has means provided, as shown, both for vertical and transverse adjustments to meet the line of the reflected light from its mirror from the zero-point to the extreme range of its angular movement when under deflection. In addition to this, however, the supporting-base of each of the scales G', H', and I' is adapted to slide in grooves in the platform M on which they are mounted, so that the scales can be moved toward or from the reflecting-mirrors in order to vary the range of the light-beam on each scale and adjust it for direct reading or otherwise. The scales, however, may be mounted in a similar manner upon a side wall or screen, if found more convenient, or dispensed with if the instruments denote deflections by a pointer. My improved apparatus is conveniently arranged in a box or case N, in which are placed the standard cell C, Fig. 5, battery D, the four switches S to S³, and the resistances employed as denoted by R. Suitable provision is made for joining up the various connections to the terminals, as will be understood by electricians or instrument-makers.

It is to be understood that the high resistance E, referred to above as the "ratio" resistance, is so adapted that a third connection can be made to it at any desired point within its range across a corresponding number of ohms, so that when a battery, such as D, is connected across the extreme terminals of the resistance a desired or corresponding voltage is obtained by the said third connection and applied to an electrostatic instrument in the manner and for the purpose above described.

What I claim, and desire to secure by Letters Patent, is—

1. The herein-described method of electrostatically measuring electric currents in a working circuit, which comprises the setting up of an electrostatic instrument with suitable connections to the said circuit, testing, comparing by standard, and calibrating the said instrument and taking a deflection reading therefrom upon a suitable adjusted scale; then making measurements of the current in the said circuit under working conditions by a deflection reading or readings upon the said scale as adjusted; and finally retesting or calibrating the instrument by a further reading or readings upon the said scale as first adjusted, substantially as and for the purpose herein described.

2. The herein-described method of electrostatically measuring electric currents in a working circuit, which comprises the setting up of an electrostatic instrument with suitable connections to the said circuit; then taking and noting one or more deflection readings upon a suitable scale of the current from the said circuit under working conditions; and finally ascertaining the value of the said deflection readings by adjustments of the ratio of resistance in shunt with the battery until the exact deflection of the readings under working conditions are reproduced, substantially as and for the purpose herein described.

3. The herein-described method of electrostatically measuring electric currents in a working circuit by first testing or calibrating an electrostatic wattmeter, voltmeter, and ammeter by means of a suitable standard cell, ratio resistance, and battery, and taking deflection readings therefrom upon suitably-adjusted scales; then connecting the said instruments to the circuit to be tested, and taking measurements of the current therefrom under working conditions by deflection readings upon the said adjusted scales, substantially in the manner and for the purpose hereinbefore described.

4. The herein-described method of electrostatically measuring electric currents in a working circuit by first testing or calibrating an electrostatic wattmeter, voltmeter, and ammeter by means of a suitable standard cell, ratio resistance, and battery, taking deflection readings therefrom upon scales suitably adjusted for direct reading; then connecting the said instruments to the circuit to be tested and taking measurements of the current therefrom under working conditions by deflection direct readings upon the said scales so adjusted, as and for the purpose hereinbefore described.

5. The herein-described method of electrostatically measuring electric currents in a working circuit by connecting an electrostatic wattmeter, voltmeter, and ammeter to the said circuit and taking deflection readings therefrom under working conditions upon suitable scales; then calibrating the said instruments by means of a suitable standard cell, ratio resistance, battery, and readings upon the said scales adjusted for direct reading; and finally reproducing the original deflections upon the said scales so adjusted and ascertaining their value directly as and for the purpose hereinbefore described.

In witness whereof I have hereunto signed my name in the presence of two subscribing witnesses.

GEORGE LEONARD ADDENBROOKE.

Witnesses:
CALEB A. BRETT,
WALTER E. ROCHE.